Figure 1:
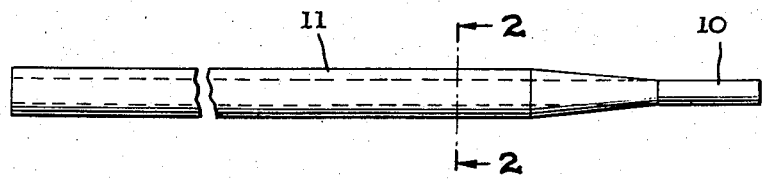

May 26, 1959     T. M. I. NORÉN     2,888,371

ARC WELDING ELECTRODES

Original Filed March 21, 1955

Inventor
Tore Mans Ivan Norén
by Sommers & Young
Attorneys

United States Patent Office 2,888,371
Patented May 26, 1959

2,888,371

ARC WELDING ELECTRODES

Tore Måns Ivan Norén, Gothenburg, Sweden, assignor to Elektriska Svetsningsaktiebolaget, Gothenburg, Sweden, a corporation of Sweden Original application March 21, 1955, Serial No. 495,761. Divided and this application July 23, 1956, Serial No. 599,297

8 Claims. (Cl. 117—207)

This application is a division of my application Ser. No. 495,761, filed on March 21, 1955, as a continuation-in-part of my application Ser. No. 130,073, filed on Nov. 29, 1949, as a division of my application Ser. No. 79,297, filed March 2, 1949.

This invention relates to weld deposits suitable for forming hard facings on metallic articles, as well as to arc welding electrodes for producing such articles or facings.

It is well-known practice to use welding, for instance arc welding, to provide various articles with a facing of an alloy having greater hardness or resistance to abrasion or better cutting capacity than the base material of the article. This type of welding is sometimes referred to as "hard facing." For instance, cutting tools have been provided with a facing of stellite deposited by welding. For the welding of hard facings on to the working faces of hot and cold working tools it has been proposed to use chromium-nickel-molybdenum-steels having, for instance, the following composition: carbon 0.7%, chromium 3%, nickel 3%, molybdenum 8% and the balance iron. Another known alloy for hard facing contains tungsten 6%, chromium 3.25%, carbon 0.5%, manganese and silicon about 0.5% each, and the balance iron.

It is an object of the invention to provide an improved welding electrode particularly suited for hard facing purposes which has a good weldability and yields a welding deposit which has little or no tendency to cracking and has a satisfactory hardness combined with good strength properties generally. Another object is the provision of an improved welding electrode for use in cases when a welding deposit is required the hardness or strength of which must be maintained at higher temperatures, for instance 500 to 600° C. Still another object is the provision of a welding electrode particularly suited for the hard facing of so-called hot working tools, that is, tools used for the working of metal at elevated temperatures, for instance drop forging dies, pressing dies, extruding press nozzles, dies for die casting machines, mandrels for piercing mills, mandrels for the hot drawing of tubes, rolls for rolling mills and shear members for hot shears. The invention also has for a more general object to provide a new type of alloyed weld metal deposit presenting improved properties in any of the respects just referred to.

The improved weld metal deposit according to the invention is generally characterized thereby that it consists of a steel containing metal from the group consisting of tungsten and molybdenum in a total amount of not less than 3%, the content of molybdenum not exceeding 1% and the content of tungsten plus twice the content of molybdenum being not lower than 4% and not higher than 10%, carbon from about 0.2% to about 0.5%, columbium from about 0.1% to about 1.2%, and the balance substantially iron, the iron content exceeding 50%.

The weld deposit according to the invention may be produced by any suitable welding process, such as the arcatom welding process or the oxy-acetylene welding process. With any of the two processes named, the weld-rod required may consist of a cast or sintered or rolled rod having substantially the composition of the alloyed steel to be deposited. It is preferred, however, to employ electric arc welding with the coated electrode according to the invention. Said electrode is characterized principally thereby that it consists of a metallic core and a coating thereon, said coating substantially consisting of fluxforming substances, metallic substances, carbon, and a binder, the metallic elements of said core and coating being so chosen and proportioned that the total weight of metal present in the electrode contains at least a total of 3% metal from the group consisting of tungsten and molybdenum, the content of molybdenum not exceeding 1% and the content of tungsten plus twice the content of molybdenum being not lower than 4% and not higher than 10%, from about 0.1% to about 1.5% of columbium, and the balance substantially iron, the iron content amounting to not less than 50% and the weight of carbon present in the electrode amounting to not less than 0.2% and not more than about 1.2% of the total weight of metal contained in the electrode.

The properties of the weld metal deposit according to the invention, particularly at elevated temperatures, will be improved by the addition of an appreciable amount of chromium not exceeding, however, about 6%. The preferred range of chromium contents is between 0.5% and 2%. An addition of nickel or cobalt or both of said metals is also within the invention. Preferably the weld metal deposit contains nickel and/or cobalt in such amounts that the sum of the nickel content and twice the cobalt content will be in the range between 0.5% and about 5%. As a rule, cobalt is to be preferred to nickel for such applications in which the weld metal deposit is to be subjected to stresses at elevated temperatures, cobalt being more efficient than nickel in improving the softening resistance of the alloy. A cobalt content about 2% will generally be suitable. The weld metal deposit according to the invention may also contain minor amounts of other alloying elements, among which manganese and silicon may be mentioned. For each of said metals, a content having the order of magnitude of 1% may be stated as suitable.

As already stated above, a columbium content in the range between 0.1% and 1.2% is an essential feature of the weld metal deposit according to the invention. It is preferred to employ columbium contents not below 0.3%. To obtain the best results, it is recommended to choose the columbium content of the weld metal deposit within the narrower range of 0.5% to 1%.

While the weld metal deposit according to the invention may be hardened in the usual manner by cooling at a sufficient rate from the solution temperature, such hardening may be dispensed with, inasmuch as an equal or higher degree of hardness may be attained by a tempering treatment of the unhardened alloy at a temperature suited to the composition of the alloy (about 600° C.). The possibility of dispensing with the usual hardening treatment is in many cases valuable. The columbium content of the weld metal deposit according to the invention furthermore will have a marked effect upon the tempering properties of the deposit, namely a broadening of the temperature range within which the maximal hardness is developed through precipitation hardening or within which no falling off of said maximal hardness will occur. It follows from this, firstly, that the tempering can be effected at lower temperatures or within wider temperature limits than if no columbium were present, secondly that the hardened weld metal may be subjected to higher operating temperatures than those otherwise possible without loss of hardness.

It should be pointed out, however, that in many cases no heat treatment whatever of the weld-on facing is required.

The following particular example of a weld metal deposit according to the invention is intended primarily for the hardfacing of hot working tools:

| | Percent |
|---|---|
| C | 0.30 to 0.35 |
| Si | 0.5 to 1 |
| Mn | 0.5 to 1.5 |
| Cr | About 1.5 |
| W | About 8 |
| Co | About 2 |
| Nb | 0.5 to 0.6 | and the remainder substantially iron with or without usual contaminations.

A weld metal deposit of this type has a hardness of 40 to 45 $H_{RC}$ in the as-welded condition. Annealing to 600° C. will cause the hardness to increase to about 53 $H_{RC}$.

Figure 2:
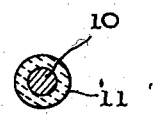

In the accompanying drawing Fig. 1 is a side view of a coated electrode in accordance with an embodiment of the present invention; and Fig. 2 is a sectional view of the electrode of Fig. 1 on the line 2—2 thereof.

In these figures the core is indicated at 10 and the coating at 11.

The flux-forming composition of the coating of the arc welding electrode according to the invention may be of any suitable type, for instance any of the known types developed for electrodes of the austenitic stainless steel type or the high chromium ferritic steel type. It is preferred, however, to employ a flux-forming composition of the basic type, the main components of which are limestone and fluorspar with or without an addition of titanium dioxide, for instance in the form of rutile. In addition to the flux-forming composition and the binder, the coating may contain only such metallic additions which serve mainly as desoxidants, for instance ferromanganese or ferrosilicon or both, in which case the core contains the bulk of the ingredients of the weld metal deposit produced by the electrode. It is preferred, however, to use a coating which contains also one or more of the constituents of the desired weld metal deposit, for instance in the form of powdered metals or alloys, or sometimes in the form of powdered metal compounds, for instance oxides. Thus for instance the columbium content of the welding electrode may be present in the coating in the form of ferro-columbium or in the form of oxide or ore, for instance columbite. In the latter case, the coating will have to contain reducing agents, preferably silicon (for instance in the form of ferrosilicon and/or silicon carbide) in sufficient amounts to reduce the oxide or ore to metal. The core may consist of soft iron or of unalloyed or low-alloyed steel, in which case the coating contains the bulk of the alloying constituents, sometimes also part of the iron which is to form a constituent of the weld metal deposit. The alloying constituents may, as known, either be evenly distributed in the flux composition or form a separate layer of the coating. The coating may, for instance, consist of an inner layer containing substantially only metallic ingredients plus a binder, e.g. water glass, and an outer layer containing substantially only fluxing compounds and a binder.

Regarding the choice of the definite proportions between the various constituents of the welding rod according to the invention due regard should, of course, be had to the well-known fact that the losses through oxydation or burning-off are different for different constituents. Thus, the loss rates of, for instance, silicon, manganese, carbon and columbium are greater than the loss rate of nickel and iron, while the loss rate of, for instance, tungsten is equal to or slightly smaller than the loss rate of iron. This means, for instance, that the proportion between the columbium and the iron contents of the welding electrode should as a rule be somewhat greater than the proportion between the columbium and the iron contents of the weld metal deposit. Accordingly, the proportion of columbium contained in the electrode, expressed in percent of the total weight of the metallic constituents contained in the electrode, may be as much as 1.5% against the maximum of 1.2% indicated for the weld metal deposit. Preferably the weight of columbium present in the electrode should not be lower than 0.35% of the total weight of metal contained in the electrode. The proportions of tungsten, molybdenum, chromium and cobalt should be within substantially the same respective ranges as those indicated for the weld metal deposit.

The welding electrode will usually contain some manganese and silicon. The content of either of said metals is not very critical. In both cases the range of 0.75 to 3% of the total weight of metal may be stated as suitable.

The total weight of carbon present in the electrode will be composed of the carbon contained in the core plus the carbon supplied through the coating. In addition to the carbon usually present in the ferro-alloys contained in the coating, it will sometimes be necessary to provide extra carbon, for instance in the form of powdered graphite or charcoal or silicon carbide, in order to obtain the required carbon content of the weld metal deposit. As the carbon recovery figure is comparatively poor, especially so for graphite or charcoal, it may be necessary to increase the total carbon content of the electrode to about 1.2% of the total weight of the metal present.

According to a preferred embodiment of the invention, an arc welding electrode may have a core of iron or mild steel and a coating containing, in addition to a flux-forming composition of the basic (or limestone-fluorspar) type and a binder, carbon, manganese, silicon, chromium, tungsten, cobalt, columbium and iron in such proportions that the total weight of metal present in the electrode is composed of

| | Percent |
|---|---|
| Manganese | About 1.5 |
| Silicon | About 1.5 |
| Chromium | 0.75 to 2 |
| Tungsten | About 8 |
| Cobalt | 1.5 to 2.5 |
| Iron substantially the balance, | | the total weight of carbon present in the electrode amounting to 0.2 to 0.9% of the total weight of metal.

The composition indicated below is an example of a suitable coating composition for an arc welding electrode according to the invention of the type comprising a core of carbon steel having a carbon content of about 0.08% and a coating consisting of fluxing substances mixed with metallic ingredients.

| | Percent |
|---|---|
| Ferromanganese | 3 |
| Ferro-chromium | 6 |
| Ferro-tungsten | 22.5 |
| Ferro-columbium | 3 |
| Cobalt | 6 |
| Ferro-silicon | 7 |
| Charcoal | 1.5 |
| Flux | 51 |

The flux may consist of limestone and fluorspar with or without an addition of rutile. The following table indicates the composition of the metallic portion (including carbon) of the electrode and the composition of the weld deposit for an electrode of this kind in which the weight of coating per unit of length amounts to 59% of the weight of the core wire per unit of length.

| Constituent | Composition of total weight of metal in electrode, percent | Composition of weld metal deposit, percent |
|---|---|---|
| C | 0.85 | 0.75 |
| Mn | 1.4 | 0.7 |
| Si | 1.4 | 0.8 |
| Cr | 1.7 | 1.7 |
| W | 8.0 | 8.0 |
| Co | 2.5 | 2.5 |
| Nb | 0.85 | 0.8 |
| Fe | balance | balance |

In the above example, and generally in welding electrodes according to the invention, the ferro-columbium used may be the ordinary or commercial ferro-columbium, which usually contains a substantial proportion of tantalum.

While the welding electrodes according to the invention are particularly suited for hard facing, they may also in certain cases be used for joint welding purposes, for instance for joining or attaching objects consisting of alloys having compositions similar to the composition of the welding deposit.

I claim:

1. An arc welding electrode consisting of a metallic core and a coating thereon, said coating substantially consisting of flux-forming substances, metallic substances, carbon, and a binder, the metallic constituents of said core and said coating being so chosen and proportioned that the total weight of metal contained in the electrode contains at least a total of 3% metal from the group consisting of tungsten and molybdenum, the content of molybdenum not exceeding 1% and the content of tungsten plus twice the content of molybdenum being not lower than 4% and not higher than 10%, from about 0.1% to about 1.5% of columbium, and the balance substantially iron, the iron content amounting to not less than 50% and the weight of carbon present in the electrode amounting to not less than about 0.2% and not more than about 1.2% of the total weight of metal contained in the electrode.

2. An arc welding electrode consisting of a metallic core and a coating thereon, said coating substantially consisting of flux-forming substances, metallic substances, carbon, and a binder, the metallic constituents of said core and said coating being so chosen and proportioned that the total weight of metal contained in the electrode contains at least a total of 3% metal from the group consisting of tungsten and molybdenum, the content of molybdenum not exceeding 1% and the content of tungsten plus twice the content of molybdenum being not lower than 4% and not higher than 10%, from about 0.1% to about 1.5% of columbium, a significant amount of chromium not exceeding 6%, and the balance substantially iron, the iron content amounting to not less than 50% and the weight of carbon present in the electrode amounting to not less than about 0.2% and not more than about 1.2% of the total weight of metal contained in the electrode.

3. An arc welding electrode as claimed in claim 2 which contains an amount of chromium equal to about 0.5 to 2% of the total weight of metal contained in the electrode.

4. An arc welding electrode as claimed in claim 1 which additionally contains metal from the group consisting of nickel and cobalt, the weight of said additional metal amounting to not less than 0.25% of the total weight of metal contained in the electrode, the nickel content plus twice the cobalt content exceeding 0.5% but not exceeding about 5% of said total weight of metal.

5. An arc welding electrode as claimed in claim 1 in which the weight of columbium present in the electrode exceeds 0.35% of the total weight of metal contained in the electrode.

6. An arc welding electrode consisting of a core of mild steel and a coating containing, in addition to flux-forming constituents and a binder, carbon, manganese, silicon, chromium, cobalt, columbium, and metal from the group consisting of tungsten and molybdenum, in such proportions that the total weight of metal present in the electrode contains at least a total of 3% metal from the group consisting of tungsten and molybdenum, the content of molybdenum not exceeding 1% and the content of tungsten plus twice the content of molybdenum being not lower than 4% and not higher than 10%, from about 0.75% to about 3% of manganese, from about 0.75% to about 3% of silicon, from about 1% to about 2.5% of cobalt, from about 0.1% to about 1.5% of columbium, and the balance of said total weight of metal substantially iron, the iron content amounting to not less than about 80% of said total weight, while the weight of carbon present in the electrode amounts to not less than about 0.2% and not more than about 1.2% of the total weight of metal present in the electrode.

7. An arc welding electrode consisting of a core of mild steel and a coating containing, in addition to a flux-forming composition of the limestone-fluorspar type and a binder, carbon, magnanese, silicon, chromium, tungsten, cobalt, columbium and iron in such proportions that the total weight of metal present in the electrode is composed of manganese about 1.5%, silicon about 1.5%, chromium between 0.75 and 2%, tungsten about 8%, cobalt 1.5 to 2.5%, columbium about 0.8%, and iron substantially the balance, the total weight of carbon present in the electrode amounting to 0.2 to 0.9% of the total weight of metal.

8. The modification of the arc welding electrode claimed in claim 1 in which the columbium is replaced by at least an equivalent amount of an oxidic compound of columbium together with silicon in at least the quantity theoretically required for reducing the columbium compound to metallic columbium.

References Cited in the file of this patent

UNITED STATES PATENTS

| | | |
|---|---|---|
| 2,011,706 | Blumberg | Aug. 20, 1935 |
| 2,067,630 | Franks | Jan. 12, 1937 |
| 2,219,462 | Wissler | Oct. 29, 1940 |
| 2,294,834 | Cooper | Sept. 1, 1942 |
| 2,317,421 | Tholand | Apr. 27, 1943 |
| 2,436,884 | Fast | Mar. 2, 1948 |